United States Patent Office 3,023,192
Patented Feb. 27, 1962

3,023,192
SEGMENTED COPOLYETHERESTER ELASTOMERS
Joseph Clois Shivers, Jr., West Chester, Pa., assignor to E. I. du Pont de Nemours and Company, Wilmington, Del., a corporation of Delaware
No Drawing. Filed May 29, 1958, Ser. No. 738,637
18 Claims. (Cl. 260—75)

This application is a continuation-in-part of my copending application Serial No. 551,460, filed December 6, 1955, now abandoned, which is a continuation-in-part of application Serial No. 502,508, filed on April 19, 1955, and Serial No. 329,114, filed December 31, 1952, now both abandoned.

This invention relates to linear copolyesters and especially to elastomers prepared from compositions of certain polyester-forming components. More particularly, this invention relates to elastic fibers and films and similar shaped structures prepared from such copolyesters.

Most fiber-forming synthetic materials which have been proposed for replacement of rubber have fallen short, especially in the rate and degree of elastic recovery from deformation frequently referred to as "snap." For the purposes of this invention high elastic recovery is defined as being of the order of 90% or better within one minute after the tension has been released from the sample which has been elongated 50% at the rate of 100% per minute and held at 50% elongation for one minute. Stress decay is defined as the percent loss in stress in a yarn one minute after it has been elongated to 50% at the rate of 100% per minute.

For applications in textile and allied fields natural or synthetic rubber possess a number of disadvantages which tend to offset its desirable elastic properties. For example it cannot be used in garments without having its strands covered with such materials as cotton, or rayon, because of its unpleasant and undesirable effects when in contact with skin. It is colored, possesses an unpleasant odor, and is subject to deterioration under the influence of light and/or oxygen and rapidly loses its strength and elasticity. It is, therefore, desirable to find a new material which is highly elastic and has a higher modulus than rubber but which does not possess the undesirable characteristics of rubber. Elastic filaments and fibers having overall properties superior to those of rubber would occupy a place of considerable importance in the field of textiles and the like.

An object of this invention, therefore, is to provide a synthetic material capable of being formed into filaments, film and like structures which will possess high elastic recovery. Another object is to provide a synthetic filament- and film-forming polymer having the high elastic recovery characteristics of rubber, but which is substantially free of the disadvantages that rubber has in the textile field. Another object is to provide a process for preparing these polymers. These and other objects will be evident from the following discussion.

The objects of this invention are accomplished by providing a segmented or ordered copolyetherester comprising about 25% to about 65% by weight of segments of an aromatic polyester which melts above 200° C. in the fiber-forming molecular weight range (i.e., when the chain length of the polymer is sufficient for it to have a molecular weight of at least about 5,000) and about 35% to about 75% by weight of polyetherester units or segments prepared from difunctional polyethers having molecular weights in the range of approximately 350–6,000. This description of the invention is not intended to imply or require that the aromatic polyester segment of the copolymer actually have a molecular weight greater than 5,000, but is intended to mean that the aromatic ester portion present must be a segment (contain one or more repeating units) of a polymer which melts above 200° C. when its molecular weight is high enough for it to be fiber-forming.

These products have elastic recoveries of the order of 90% or better and stress decays below about 25%. Polyesters are prepared by condensing two small molecules to form a repeating unit of a polymer. Substantially all (i.e., above about 95%) of the repeating units of the polyester portions of the copolymers of this invention must contain an aromatic ring, which may be derived from an aromatic dicarboxylic acid in which the carboxyl groups are attached directly to the aromatic ring or from a bis-phenol. In either case, the ester linkages are attached directly to an aromatic ring. The preferred aromatic polyester segments of the copolyesters of this invention are prepared from aliphatic glycols and symmetrical aromatic dicarboxylic acids or their ester-forming derivatives.

The copolyetheresters of this invention are prepared by reacting one or more dicarboxylic acids or their ester-forming derivatives, one or more difunctional polyethers with the formula:

$$HO(RO)_nH$$

(in which R is one or more divalent organic radicals and $n$ is an integer of a value to provide a glycol with a molecular weight of between about 350 and about 6,000), and one or more dihydroxy compounds selected from the class consisting of bis-phenols and lower aliphatic glycols with the formula:

$$HO(CH_2)_aOH$$

(in which $a$ is 2–10), with the proviso that the reactants be selected so that substantially all of the repeating units of the polyester contain at least one aromatic ring. The resulting ester is then polymerized.

The reaction may be carried out in bulk or in a solvent medium which dissolves one or both of the reactants.

The preferred method for preparing these copolyether esters is to subject to an ester interchange reaction, followed by polymerization, one or more ester-forming derivatives of aromatic dicarboxylic acids in which the carboxyl groups are attached directly to the aromatic ring, one or more difunctional polyethers with the formula:

$$HO(RO)_nH$$

(in which R is one or more divalent organic radicals and $n$ is an integer of a value to provide a glycol with a molecular weight of between about 350 and about 6,000), and one or more lower aliphatic glycols with the formula

$$HO(CH_2)_aOH$$

(in which $a$ is 2 to 10).

Representative difunctional polyethers which may be used include the poly(alkylene oxide)glycols, such as poly(ethylene oxide)glycol, poly(propylene oxide)glycol, poly(tetramethylene oxide)glycol, poly(pentamethylene oxide)glycol, poly(hexamethylene oxide)glycol, poly(heptamethylene oxide)glycol, poly(octamethylene oxide)glycol, poly(nonamethylene oxide)glycol, and poly(decamethylene oxide)glycol; the dicarboxymethyl acids of poly(alkylene oxides), such as the one derived from poly(tetramethylene oxide)

$$HOOCCH_2(OCH_2CH_2CH_2CH_2)_xOCH_2COOH$$

or their esters; polydioxolane and other polyformals prepared by reacting formaldehyde with other glycols, such as pentamethylene glycol, or mixtures of glycols, such as a mixture of tetramethylene and pentamethylene glycols. Mixtures of glycols may also be used to prepare copolyethers, e.g., one which would have both ethylene oxide and tetramethylene oxide units in the polyether chain.

Some of the alkylene radicals in these polyethers may be replaced by arylene or divalent cycloaliphatic radicals. The use of polyethers containing arylene radicals is illustrated in Example XVIII. Suitable polyethers are those which have a molecular weight within the range of about 350 to about 6000.

The difunctional polyether may have a single molecular weight; it may be a blend of a low and high molecular weight compound; or it may be a blend of several compounds of graduating molecular weight. It is preferred, however, that the difunctional polyether be a mixture of such polymers having a relatively narrow range of molecular weight.

The segmented copolymers of this invention consist essentially of a multiplicity of recurring intralinear etherester and ester units. The etherester units may be represented by the formula

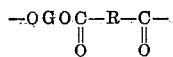

and the ester units by the formula

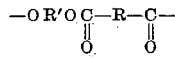

wherein G is the radical remaining after removal of the terminal hydroxyl groups from a difunctional polyether glycol having a molecular weight in the range from about 350 to about 6000, R is a hydrocarbon radical remaining after removal of the carboxyl groups from a dicarboxylic acid, and R' is a hydrocarbon radical remaining after removal of the hydroxyl groups from an organic diol, at least one of the radicals R and R' being a divalent aromatic radical having the free valences attached directly to an aromatic ring, the radicals R and R' being so selected that the structure

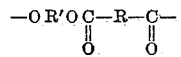

represents a repeating unit of a fiber-forming polyester having a melting point above 200° C. in its fiber-forming molecular weight range. The etherester and ester units are interconnected to provide the segmented polymeric structure through the attachment of the terminal carbonyl group of one of the etherester units to the terminal oxygen atom of one of the ester units thereby providing ester linkages. From about 35% to about 75% by weight of the segmented copolymer is provided by the etherester units and from about 65% to about 25% by weight is provided by the ester units.

The weight percent of the polyetherester units in the copolymer is given by the following expression, as illustrated for a poly(ethylene oxide) terephthalate copolyester:

Percent PEGT $$= \frac{\text{wt. PEG} \frac{\text{PEGT}}{\text{PEG}} \times 100}{\text{wt. PEG} \frac{\text{PEGT}}{\text{PEG}} + \left[\left(\text{wt. DMT} - \text{wt. PEG} \frac{\text{DMT}}{\text{PEG}}\right)\frac{\text{EGT}}{\text{DMT}}\right]}$$

in which percent PEGT=percent by weight of polyethylene oxide) terephthalate units in the polymer. The copolymer with ethylene glycol has the formula

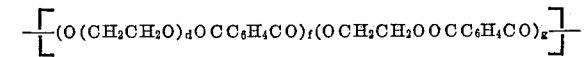

in which d, f, and g are integers.

Weight PEG=weight poly(ethylene oxide) glycol used.
Weight DMT=weight dimethyl terephthalate used.
PEGT=molecular weight of PEGT unit.
EGT=molecular weight of ethylene terephthalate unit.[1]

[1] The unit referred to is (OCH₂CH₂OOCC₆H₄CO)

PEG=molecular weight of poly(ethylene oxide) glycol.
DMT=molcular weight of dimethyl terephthalate.

This calculation requires that the molecular weight of the difunctional polyether be known. In some instances it has been found difficult to obtain highly precise values of the molecular weight of the higher molecular weight difunctional polyethers. When these materials are used, the calculation of the composition of the copolymer is subject to a certain amount of error, since the calculated results are only as valid as the molecular weight determinations. However, the calculation is workable to give reasonable accuracy.

The above formula represents one preferred embodiment of the invention. In a broader, but satisfactory embodiment, substitutions in the formula may be made. For example, the ethylene group (—CH₂CH₂—) may be any alkylene group up to about 10 carbons. The benzene residue (—C₆H₄—) may be that of any aromatic compound which is unsubstituted or is symmetrically substituted with nonreactive groups. In the formula d is of a value to give a molecular weight between about 350 and 6000, f is of a value which will yield a copolymer containing about 35% to 75% by weight of the combined groups within the brackets, and g is of a value to represent from 65% to 25% by weight of the two components within the brackets in the copolymer.

The preferred difunctional polyether is poly(tetramethylene oxide) glycol. Optimum elastomeric properties are obtained with copolyesters containing from about 40% to about 70% of poly(tetramethylene oxide) glycol-aromatic acid ester units derived from poly(tetramethylene oxide)glycols with molecular weights in the range of 800 to 1,800. Terephthalic acid or its derivatives have been used to prepare a majority of the compositions because of its relatively low cost and ready availability.

When the difunctional polyether is poly(ethylene oxide)glycol, the preferred compositions are copolyesters from ethylene glycol, poly(ethylene oxide)glycol, and terephthalic acid containing about 50% to about 70% of a poly(ethylene oxide) terephthalate unit derived from a poly(ethylene oxide)glycol with a molecular weight of 1,000 to 4,000. Very satisfactory products have been prepared from copolyesters of this type which contain 60% to 70% by weight of a poly(ethylene oxide) terephthalate unit prepared from a poly(ethylene oxide)-glycol having an average molecular weight of approximately 4,000 and a relatively narrow molecular weight range. Also preferred are compositions prepared from ethylene glycol, polydioxolane, and terephthalic acid or its ester-forming derivatives.

A list of aromatic polyesters with melting points above 200° in the fiber-forming molecular weight range may be found on pages 155–157 of "Fibres From Synthetic Polymers" edit. by Rowland Hill, Elsevier Pub. Co., 1953. Aromatic dicarboxylic acids which may be used to prepare the high melting polyester segment of these copolymers are terephthalic acid, isophthalic acid, symmetrically substituted dicarboxyphenyl compounds, bibenzoic acid, bis(p-carboxyphenyl) methane, p-oxy(p-carboxyphenyl) benzoic acid, ethylene-bis(p-oxybenzoic acid), ethylene-bis-p-benzoic acid, tetramethylene-bis(p-oxybenzoic acid), 1,5-naphthalene dicarboxylic acids, 2,6-naphthalene dicarboxylic acids, 2,7-naphthalene dicarboxylic acids and others. The ester-forming derivatives which may be used include the esters, such as the methyl, ethyl, phenyl, and monomeric ethylene glycol esters, and the acid halides, such as the acid chlorides.

Aliphatic dicarboxylic acids which may be used in conjunction with bis-phenols to prepare aromatic polyesters include oxalic, malonic, succinic, glutaric, adipic, pimelic, suberic, azelaic, sebacic, maleic, and fumaric.

Included among the aliphatic glycols which may be reacted with aromatic dicarboxylic acids to form the aromatic ester segment are ethylene, propylene, isobutylene, tetramethylene, pentamethylene, 2,2 - dimethyltrimethylene, hexamethylene, and decamethylene glycols. Included among the bis-phenols which may be used to prepare the aromatic esters are hydroquinone, bis-(p-hydroxy)diphenyl, bis-(p-hydroxyphenyl)methane, bis-(p-hydroxyphenyl)ethane, and bis-(p-hydroxyphenyl)propane.

The ester end groups of the polyetherester units can be obtained by using either difunctional aliphatic or aromatic derivatives of the polyether. Copolyesters containing small amounts of other types of linkages, such as polyamide, polyurethane, polysulfonamide, etc., can be prepared under certain conditions and can be utilized in this invention.

The aromatic ester segment may be all aromatic, i.e., it may be prepared by reacting one or more bis-phenols with one or more aromatic dicarboxylic acids or their ester-forming derivatives. An excellent example is the ester obtained by reacting diphenylolpropane with a mixture of terephthaloyl and isophthaloyl chlorides. The preferred compositions of this type are those in which the acids are used in the molar proportion range from 30/70 to 70/30.

*Example I*

The following example describing the preparation of a copolyester of ethylene terephthalate and poly(ethylene oxide) terephthalate illustrates one general method used for preparing the copolyesters of this invention.

Dimethyl terephthalate, ethylene glycol in excess of 2 mol equivalents, and a catalyst mixture comprising 0.15% calcium acetate monohydrate and 0.05% antimony oxide [based on weight of dimethyl terephthalate plus poly-(ethylene oxide) glycol] were added to the dried poly-(ethylene oxide) glycol in a reactor. The poly(ethylene oxide) glycol was dried prior to use, as even small amounts of water are detrimental in polyesterification. The reactor was equipped with a nitrogen bleed tube leading below the surface of the mixture, a thermometer for determining the reaction temperature and a fractionating column. Heat was supplied so as to distil methanol fairly rapidly during the exchange reaction. After the major portion of the methanol had been removed, the heating was continued at the proper rate to keep the bottom of the fractionating column at a temperature approximating the boiling point of ethylene glycol. After essentially the theoretical quantity of methanol had been removed, ethylene glycol was distilled off until the glycol/terephthalic acid mol ratio was 2:1 or less. At the end of this distillation the reactor temperature was generally about 230–235° C. The whole exchange period was normally from 5 to 7 hours. Shorter cycles may be used, but a long exchange cycle is desirable to insure complete removal of the methanol. The absence of methanol in the polymerization step which follows is desirable to insure production of the desired high molecular weight polymers.

The "monomer" mixture produced above was transferred to a polymerization vessel and protected from exposure to atmospheric moisture. The polymerization flask was equipped with a mechanical stirrer and a nitrogen bleed. The flask was heated in a bath maintained at approximately 270° C. and the polymerization carried out at a pressure of 0.1 to 0.4 millimeter of mercury. Polymerization was discontinued when the desired viscosity of the melt was obtained.

*Examples II–VII*

The data for the polymers of Examples II–VII are presented in tabular form below to show the excellent properties of a wide range of poly(ethylene oxide) glycol/ethylene glycol-terephthalic acid copolyesters. These copolyesters were all prepared by procedures equivalent to that of Example I. Tensile recovery and stress decay values are given for rubber for comparison.

| Ex. No. | Molecular weights poly-(ethylene oxide) glycol (Approx.) | Weight percent poly-(ethylene oxide) terephthalate | Polymer melt temperature, °C. | Tensile recovery, percent | Stress decay, percent |
|---|---|---|---|---|---|
| II | 4,000 | 68 | 192–196 | 90–98 | 3–8 |
| III | 4,000 | 42 | 220–232 | 98 | 17–22 |
| IV | 1,540 | 56 | 197–202 | 98–102 | 12–14 |
| V | 1,000 | 58 | 175–180 | 99 | 12 |
| VI | 600 | 50 | 180–190 | 96 | 18 |
| VII | 405 | 49 | 170–190 | 96 | 14–16 |
| Rubber | | | | 99–100 | 0–4 |

*Example VIII*

Forty parts of dimethyl terephthalate, 60 parts of polydioxolane and an excess of ethylene glycol were subjected to ester interchange and polymerization reactions in accordance with Example I, using the catalyst mixture described in Example I. A copolyester comprising 63% polydioxolane terephthalate having a polymer melt temperature of 190–195° C. was obtained. The polymer was melted and extruded through a 10-hole spinneret. The fibers obtained were subsequently drawn 3.5× at room temperature. The drawn fibers had a tensile recovery of 99% and a stress decay of 5–7%.

*Example IX*

Fifty-four parts of dimethyl bibenzoate, 46 parts of a poly(ethylene oxide) glycol having a molecular weight of 400 and an excess of ethylene glycol were subjected to ester interchange and polymerization reactions in the presence of a catalyst as described in Example I. A copolyester containing 75% of the poly(ethylene oxide) bibenzoate was obtained which had a polymer melt temperature of 170°–180° C. The molten polymer was extruded through a 10-hole spinneret and subsequently drawn 1.5X at room temperature. The drawn fiber had a tensile recovery of 95% and a stress decay of 12%.

*Example X*

Forty parts of dimethyl terephthalate, 60 parts of dicarbethoxymethoxy poly(tetramethylene oxide) having a molecular weight of 1,300 and an excess of ethylene glycol were subjected to ester interchange and polymerization reactions in the presence of a catalyst as described in Example I. The copolyester obtained contained 33% by weight of ethylene terephthalate units and had a polymer melt temperature of 195–200° C. The polymer was a tough elastomer.

*Example XI*

Forty parts of dimethyl terephthalate, 60 parts of poly-(decamethylene oxide) glycol having a molecular weight of 1,800 and an excess of ethylene glycol were subjected to ester interchange and polymerization reactions in the presence of a catalyst as described in Example I. The resulting copolyester contained 65% by weight of the poly-(decamethylene oxide) terephthalate and had a polymer melt temperature of 135–140° C. The molten polymer was extruded through a 10-hole spinneret. The undrawn fiber had a tensile recovery of 90% and a stress decay of 18%.

*Example XII*

Forty parts of dimethyl terephthalate, 60 parts of poly-(tetramethylene oxide) glycol having a molecular weight of 960, and an excess of ethylene glycol were subjected to ester interchange and polymerization reactions in the presence of a catalyst, as described in Example I. The resulting copolyester had an inherent viscosity of 1.0. The molten polymer was extruded and drawn 5.5X to give filaments with the following properties: tenacity=0.2 g.p.d., elongation=430%, initial modulus=0.1 g.p.d., tensile recovery=97%, and stress decay=9%.

Example XIII

Forty parts of dimethyl terephthalate, 60 parts of poly(tetramethylene oxide) glycol having a molecular weight of 1,180 and an excess of ethylene glycol were subjected to ester interchange and polymerization reactions in the presence of a catalyst described in Example I. The resulting copolyester had a polymer melt temperature of 180° C. and an inherent viscosity of 0.95. The molten polymer was extruded and drawn 4X in hot steam to produce filaments with a tenacity of 0.1 g.p.d., a tensile recovery of 95%, and a stress decay of 11%.

Example XIV

Forty parts of dimethyl terephthalate, 60 parts of poly(tetramethylene oxide) glycol having a molecular weight of 1,610 and an excess of ethylene glycol were subjected to ester interchange and polymerization reactions as in the preceding examples. The resulting copolyester had a polymer melt temperature of 207° C. and an inherent viscosity of 0.92. The molten polymer was extruded and drawn 4X in hot steam to produce a drawn filament with a tenacity of 0.19 g.p.d., an initial modulus of 0.11 g.p.d., a tensile recovery of 95%, and a stress decay of 11%.

Example XV

A polyformal was prepared by reacting formaldehyde with a mixture containing 0.7 mol of tetramethylene glycol and 0.3 mol of pentamethylene glycol. Sixty parts of the polyformal obtained, 40 parts of dimethylterephthalate, 55 parts of ethylene glycol, 0.15 part of calcium acetate, and 0.05 part of antimony oxide where heated overnight at 197° C. to effect the ester exchange. The polymerization was carried out for seven hours at 270° C. under vacuum. A tough elastomer was obtained.

Example XVI

Poly(tetramethylene oxide) glycol with a molecular weight of 3,600, poly(ethylene oxide) glycol with a molecular weight of 4,000, and an excess of ethylene glycol were condensed with dimethyl terephthalate in the usual manner to produce a terpolymer with the following approximate composition: 40% ethylene terephthalate, 30% poly(ethylene oxide) terephthalate, and 30% poly(tetramethylene oxide) terephthalate. The polymer was a tough, rubbery, hydrophilic elastomer.

Example XVII

"Pluronic" L-35, a product of Wyandotte Chemical Company, believed to be poly(propylene oxide) with poly(ethylene oxide) glycol ends, and an excess of ethylene glycol were condensed with dimethyl terephthalate in the usual manner to produce a copolyester which contained approximately 40% poly(ethylene terephthalate) and the remainder "Pluronic" terephthalate. This polymer could be extruded to form hydrophilic, snappy elastic filaments.

Example XVIII

Poly(tetramethylene oxide) glycol (2000 grams) with an average molecular weight of 1000 was mixed with 264 grams of xylylene dibromide and 117 grams of potassium hydroxide. This mixture was heated at 50° C. for approximately 24 hours. The molten reaction mixture was poured into water and the product washed with water to extract inorganic salts. The product was then washed with dilute acetic acid to remove the last traces of potassium hydroxide and the acetic acid removed by further washing with water. The product was dried under vacuum at 100° C.

This copolyether (7.5 grams) containing arylene radicals was dissolved in 20 ml. of benzene and placed in a polymerization tube. The benzene was removed by heating the mixture under nitrogen, first at 100° C. and then at 180° C., and finally heating under vacuum for one-half hour at 180° C. To this were added 5.0 grams of dimethyl terephthalate, 5.6 grams (representing a molar excess) of ethylene glycol, 19 milligrams of calcium acetate monohydrate, and 7 milligrams of antimony oxide. This reaction mixture was heated overnight at 197° C. under a nitrogen atmosphere at atmospheric pressure to remove methanol. The mixture was heated for one-half hour at 218° C. and finally for one-half hour at 270° C. to remove excess ethylene glycol. Upon completion of the ester interchange the reaction mixture was heated for 5 hours at 270° C. under a pressure of 0.1 mm. to form the polyester, which was found to have an inherent viscosity in trichloroethane/phenol of 0.78.

The polymer obtained was melt-spun through a single-hole spinneret to form a monofil, which was drawn 2X at room temperature. This filament was heat set in 15 lbs. of steam for 15 minutes and boiled off and relaxed in water. The filaments obtained had the following properties: tenacity=0.10 g.p.d., elongation=170%, initial modulus=0.12 g.p.d., stress decay=13%, and tensile recovery=93%.

Example XIX

The following ingredients were placed in a polymer tube: 16 grams of poly(tetramethylene oxide)glycol with a molecular weight of 3200, 13.5 grams of bibenzoyl chloride, 4.5 grams of tetramethylene glycol, and 10 ml. of o-dichlorobenzene. A nitrogen vacuum bleed was introduced and the reaction mixture heated for 4 hours at 80° C. Hydrogen chloride was evolved vigorously and the solution became viscous. The viscous liquid was heated for 3 hours at 200° C. with increased nitrogen throughput to remove o-dichlorobenzene. After all of the solvent had been removed a light tan viscous liquid was obtained, which was heated for 4 hours at 260° C. at pressures below 1 mm. The polymer obtained had an inherent viscosity in m-cresol of 0.7 and contained approximately 60% by weight of the polyetherester segment.

Example XX

The following ingredients are charged to a suitable reactor: 10.45 grams of poly(tetramethylene oxide) glycol with a molecular weight of 2,090, 3.88 grams of succinyl chloride and 15 ml. of chlorobenzene. This mixture is heated for 3 hours at 132° C., following which 1 gram of hydroquinone and 10 ml. of chlorobenzene are added. This mixture is heated for three hours at 132° C., 1.2 grams of hydroquinone and 10 ml. of chlorobenzene added, and the mixture heated for 6 hours in air at 132° C., followed by 2 hours at 200° C. and 1 hour at 260° C. under a blanket of nitrogen. The final traces of solvent are removed by heating under vacuum at 260° C. A polymer with an inherent viscosity of 1.12 in a 40/60 trichloroethylene/phenol mixture is obtained. A monofilament prepared by melt spinning this polymer has the following properties: tenacity=0.2 g.p.d., elongation=325%, initial modulus=0.25, stress decay=19, and tensile recovery=90.

Example XXI

The following are charged to a reactor: 10.45 grams of poly(tetramethylene oxide) glycol with a molecular weight of 2090, 4.18 grams of trans-hexahydroterephthaloyl chloride, and 15 ml. of chlorobenzene. This mixture is heated under nitrogen for 3 hours at 132° C., 2.0 grams of diphenylolpropane and 12 ml. of chlorobenzene added, and heating continued for 3 hours at 132° C. Diphenylolpropane (1.42 grams) and 12 ml. of chlorobenzene are added and the reaction mixture heated for 6 hours at 132° C. A polymer with an inherent viscosity of 1.2 in 40/60 trichloroethylene/phenol is obtained. This polymer is dry spun through a 5-hole spinneret at 150–180° C. to give a fiber with the following properties: tenacity=0.18 g.p.d., elongation=325%, initial modulus=0.15 g.p.d., stress decay=18% and tensile recovery=90%.

For optimum results the segmented copolyesters of this invention should have an inherent viscosity of the order of 0.8–1.5 or above, although copolyesters having inherent viscosities as low as 0.6 are useful. This is to say that the copolyesters of particular interest are those with molecular weights in the fiber-forming range, i.e., above about 10,000. Polymers having a molecular weight of 15,000 to 40,000 are very readily produced. For the purpose of this invention inherent viscosity is defined as:

$$\frac{ln\eta_r}{C}$$

in which $\eta_r$ is the viscosity of a dilute solution of the polymer in a 60:40 mixture of phenol and tetrachloroethane divided by the viscosity of the solvent in the same units and at the same temperature, and C is the concentration in grams of the polymer per 100 cc. of solution.

The melt polymerization process employed here and described in some detail in Example I is the now conventional procedure first described in Carothers' patents U.S. 2,071,250 and U.S. 2,071,251. Thus, the copolyesters may be prepared in the melt by the action of the glycols on the dibasic acids or one of their ester-forming derivatives. For example, the dimethyl esters of the acids involved together with an excess of the glycols may be initially heated together in the molten state and at atmospheric pressure. After the ester interchange is complete, as indicated by the cessation of the evolution of methanol, the pressure is gradually reduced to the vicinity of 0.5 millimeter of mercury and the temperature increased to a range of 240–280° C. These conditions are maintained for about 4–5 hours with stirring, at which time a polymer of the desired intrinsic viscosity is obtained. The polymerization step may also be carried out with the solid reactants.

The polymerization step (reduced pressure stage) may be longer or shorter and at a somewhat different temperature, depending upon the particular reactants used. The polymerization cycle may vary appreciably from the optimum conditions described previously. It generally requires from 1 to 30 hours after a full vacuum has been achieved. The actual length of time varies with concentration, temperature, intrinsic viscosity desired, amount of color allowable in the finished polymer, degree of vacuum obtained and many other such items. The use of a catalyst will also change the timing of the cycle considerably. Suitable catalysts are described in U.S. patent 2,465,319 (Whinfield and Dickson) and 2,534,028 (Izard). In general, it is desired not to have too long a polymerization cycle, both for economic reasons and for the reason that, if the polymerization cycle is too long, the competing and irreversible thermal degradation reaction would have sufficient time to lower the intrinsic viscosity more than the polymerization reaction can raise it.

When the molten polymer has reached the desired intrinsic viscosity, it can then be extruded in ribbon form upon a cold wheel, after which the ribbon is cut into small chips. These chips can then be melted in a grid melting assembly and extruded through a spinneret by the conventional melt spinning method. It is possible, of course, to carry out the operation in a continuous manner. In a process of this sort the molten polymer from the polymerization kettle is transferred through a suitable header to one or more spinning assemblies, thus making it unnecessary to extrude the polymer to form chip followed by remelting. The temperature of the spinning or casting operation will vary, depending upon the spinning viscosity of the individual polymer. The temperature is chosen at which the polymer has a viscosity suitable for spinning under the conditions used. Generally speaking, this will be in the range of 125–275° C. Melt spinning is preferred, although solvent spinning may be used if desired.

In spinning these copolyesters a fine powder such as talc or a liquid such as water is applied to the fibers to prevent sticking of the filaments. After this treatment the filaments can be wound up in the usual manner at a rate of 600–1000 yards/minute. Generally speaking, the overall properties of the films and filaments prepared from these copolyesters are improved by a cold-drawing operation, which results in increased orientation and crystallinity in the final structure. Therefore, prior to final packaging the yarns are drawn at a suitable draw ratio for the particular copolymer and relaxed to give a product with the desired combination of elasticity, yarn elongation, tenacity, and related properties.

The copolyesters of this invention have outstanding properties which suggest many applications in the film and fiber fields. The previously discussed high elasticity is a particularly desirable feature. The elasticity of the copolyesters of this invention is surprising in view of the fact that none of the homopolyesters are elastomeric.

The copolyesters of this invention also show low stress decay, i.e., below about 20, a very desirable property for elastomeric materials. The best compositions of this invention exhibit stress decay properties equivalent to those of rubber. Most of these copolyesters show less stress decay than other so-called elastic polymers.

If desired, the properties of these copolyesters can be modified by the incorporation of fillers. In general, fillers have the same effect on the properties of these copolyesters that they have when added to rubber. Thus, they increase the initial modulus and reduce elongation. Certain rod-like and plate-like aluminas and clays, such as Du Pont fine alumina and Bentone 34, have been found to be particularly effective fillers.

Many of the copolyesters of this invention have polymer melt temperatures of above 200° C., as is shown in the examples. The combination of high elasticity and high polymer melt temperatures is unique in copolyesters prepared by normal ester interchange and polymerization techniques. The copolymers which possess this combination of properties are of particular interest.

The expression "melt temperature" of the polymeric material, as used here, is the minimum temperature at which a sample of the polymer leaves a wet molten trail as it is stroked with moderate pressure across a smooth surface of a heated block of brass. "Polymer melt temperature" has sometimes in the past been referred to as "polymer stick temperature."

Many of the copolyesters of this invention also possess the desirable characteristics of being hydrophilic. The ability to absorb moisture is desirable for a textile fiber because the fabrics made from them are more comfortable to wear. The low moisture absorption of many of the hydrophobic fibers now available is undesirable in many applications.

A usual consequence of high water absorption is low wet strength. This is an undesirable characteristic for fibers which are to be used in garments which require washing. Unexpectedly, however, the wet strengths of yarns from these copolyesters are 70% or more of the dry strengths. Even after the yarns were soaked in water for twenty-four hours, the tenacity, elongation, and modulus were decreased by less than one-third.

A polymer with high water absorption characteristics has interesting applications in film form, particularly as a replacement for leather in shoe uppers. Films prepared from the poly(ethylene oxide) glycol modified poly(ethylene terephthalate) copolyesters have been found to have "leather permeability values" (LPV) in the range of 13,000–35,000 grams/100 m.$^2$/hr. per mil. When measured under comparable conditions, shoe-upper leathers exhibit leather permeability values within the range 2,000–18,000 grams/100 m.$^2$/hr. Those exhibiting leather permeability values of 10,000–22,000 will provide wearing comfort equivalent or superior to that obtained with the lightest shoe leathers.

These leather permeability values are measures of the water vapor permeability of films. These data are in units of grams of water per 100 sq. meters per hour and were obtained in tests carried out according to a modification of the method of Kanagy and Vickers (Journal of American Leather Chemical Association 45, 211–242, April 1950). In the modification of this test used here, an approximately three inch diameter crystallizing dish is filled with 12-mesh calcium chloride and covered (using tight, non-permeable seals at the edges) with a sample of the pliable film under test. The dish is then suspended inverted in an atmosphere of high humidity. The equilibrium rate of water absorption by the calcium chloride is obtained by weighing the assembly at suitable intervals. The copolyesters of this invention also possess greatly improved dyeability as compared to the related unmodified aromatic polyesters.

Although the copolyesters of this invention possess many desirable properties, it is sometimes desired to stabilize certain of the compositions to heat or radiation by ultra-violet light. Fortunately, this can be done very readily by incorporating stabilizers in the polyester compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Following are specific examples of the above classes of compounds which have been found particularly useful as stabilizers. Catechol, 2,2' - methylene bis(6 - t - butyl - 4-methyl phenol), ferulic acid, salicylalazine diphenylacetamidine, beta-conidendrol vannillalazine diisoeugenol, sodium-2-hydroxy-1-naphthalene propionic acid, copper 3-phenyl salicylate, 2,4,2',4'-tetra-hydroxybenzalazinehydroquinone, benzoin, manganous salicylate, manganous ferulate, manganous 1-hydroxy-2-naphthalene propionic acid, manganous salicylate-ferulic acid mixture (50/50), manganous salicylate-sodium-1-hydroxy-2-naphthalene propionic acid (50/50), and butylated hydroxyanisole are representative phenolic compounds. N,N'-bis(beta-naphthyl)p-phenylene diamine, p-chloro-o-phenylene diamine, 5 - amino - 2 - benzimidazole, 2-nitrodiphenylamine, and phenyl-alpha-naphthylamine are representative of useful compounds containing amine groups. Suitable metal salts include nickelous hydroxide, manganous hydroxide, cuprous chloride, and manganous salicylate. Poly(diphenylolpropane isophthalate) and poly(resorcinol isophthalate) are representative of useful polymeric phenolic esters. Phenothiazine and quinone dioxime are representative of hydroxy azines and oximes respectively. p-Hydroxyphenyl glycine is a useful stabilizer which contains both hydroxyl and amine groups. Preferred stabilizers are N,N'-bis(beta-naphthyl) p-phenylenediamine and 2-nitrodiphenylamine. Of course, these certain copolyesters will need no stabilization if the application to which they are put does not involve exposure to heat and ultraviolet light.

The elastic polymer yarns of this invention are characterized by higher strength and higher stretch modulus than any rubber threads known. Stretch modulus measures the force required to elongate the yarn a given percentage. A garment made of yarns having high tenacity and high stretch modulus will not only be durable but will also exert substantial pressure upon the body of the wearer after the garment is stretched into position as desired, for example, in surgical stockings. Yarns of this invention have many advantages over rubber threads. For example, they may be spun readily into multifilament yarns and into low denier filaments, i.e., filaments having a denier below 250. They have a very low inherent color, may be dyed by common dyestuffs, need no plasticizers which might later be leached out of the yarn, and have a good resistance to perspiration or greases and many other common chemicals. Furthermore, these elastic yarns are capable of very quick elastic recovery, a property which is lacking in many of the so-called elastic fibers. It is quite evident that yarns prepared from the copolyesters of this invention would find many uses in the textile and allied fields. For example, the yarns of this invention may be used for the manufacture of two-way stretch, woven and knitted articles. They may also be used as either warp or weft threads in one-way stretch fabrics. Other useful applications for these filaments are in non-woven fabrics and as bonding fibers in papers prepared from synthetic polymer filaments.

It is obvious that these copolyesters would be useful in forms other than yarn, since the desirable properties are inherent in the polymers. The possible use as replacements for shoe-upper leather has already been mentioned. In addition they might be used in the preparation of elastic films, elastic coatings for other films and fabrics, flexible tubing and safety glass interlayers.

Any departure from the above description which conforms to the present invention is intended to be included within the scope of the claims.

I claim:

1. A segmented copolymer having an elastic recovery of at least 90% and a stress decay below about 25% consisting essentially of a multiplicity of recurring intralinear etherester and ester units, said etherester units being represented by the formula

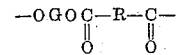

and said ester units being represented by the formula

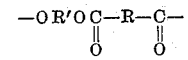

wherein G is the radical remaining after removal of the terminal hydroxyl groups from a difunctional polyether glycol having a molecular weight in the range from about 350 to about 6000, R is a hydrocarbon radical remaining after removal of the carboxyl groups from a dicarboxylic acid, and R' is a hydrocarbon radical remaining after removal of the hydroxyl groups from an organic diol, at least one of said radicals R and R' being a divalent aromatic radical having the free valences attached directly to an aromatic ring, said radicals R and R' being so selected that the structure

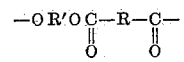

represents a repeating unit of a fiber-forming polyester having a melting point above 200° C. in its fiber-forming molecular weight range, said etherester and said ester units being interconnected to provide a segmented polymeric structure wherein the terminal carbonyl group of one of said etherester units is connected to the terminal oxygen atom of one of said ester units to provide an ester linkage, from about 35% to about 75% by weight of said segmented copolymer being provided by said etherester units and from about 65% to about 25% by weight being provided by said ester units.

2. The segmented copolymer of claim 1 wherein said dicarboxylic acid is terephthalic acid.

3. The segmented copolymer of claim 2 wherein said difunctional polyether glycol is poly(ethylene oxide) glycol and said organic diol is ethylene glycol.

4. The segmented copolymer of claim 3 wherein said poly(ethylene oxide)glycol has a molecular weight between about 1000 and 4000.

5. The segmented copolymer of claim 3 wherein from about 50% to about 70% of the weight of said copolymer is provided by said etherester units.

6. The segmented copolymer of claim 1 wherein said difunctional polyether glycol is polydioxolane.

7. The segmented copolymer of claim 6 wherein said dicarboxylic acid is terephthalic acid and said organic diol is ethylene glycol.

8. The segmented copolymer of claim 1 wherein said copolymer has an inherent viscosity of at least 0.6.

9. The segmented copolymer of claim 1 wherein said copolymer has a molecular weight between about 10,000 and 40,000.

10. The segmented copolymer of claim 1 wherein said difunctional polyether glycol is poly(tetramethylene oxide)glycol.

11. The segmented copolymer of claim 10 wherein said dicarboxylic acid is terephthalic acid and said organic diol is ethylene glycol.

12. A high elastic recovery shaped article prepared from the segmented copolymer of claim 1.

13. The shaped article of claim 12 in the form of a filament having a denier below 250, an elastic recovery of at least 90%, a stress decay below 20%, and an elongation of at least 250%.

14. The process of preparing a segmented copolymer having an elastic recovery of at least 90% and a stress decay below about 25% consisting essentially of a multiplicity of etherester and ester segments which comprises polymerizing a mixture of an ester-forming derivative of an aromatic hydrocarbon dicarboxylic acid, in which the carboxyl groups are attached directly to the aromatic ring with a difunctional polyether glycol having a molecular weight between 350 and 6000, and an organic diol having the formula HO(R)OH wherein R is a hydrocarbon radical, said dicarboxylic acid derivative and said organic diol being capable of forming a polyester having a melting point above 200° C. in its fiber-forming molecular weight range, said dicarboxylic acid derivative and said organic diol being present in the reaction mixture in a proportion to provide from about 25% to about 65% by weight of ester segments therefrom in said segmented copolymer.

15. The process of claim 14 wherein said difunctional polyether glycol consists of a blend of polyether glycols.

16. The process of claim 14 wherein said dicarboxylic acid derivative is dimethylterephthalate and said organic diol is ethylene glycol.

17. The process of preparing a segmented copolymer having an elastic recovery of at least 90% and a stress decay below about 25% consisting essentially of a multiplicity of etherester and ester segments which comprises polymerizing a mixture of a dicarboxylic acid, a polyether glycol having a molecular weight between 350 and 6000, and an organic diol having the formula HO(R)OH wherein R is a hydrocarbon radical selected from the group consisting of aliphatic and aromatic radicals, said dicarboxylic acid and said organic diol being capable of forming a polyester having a melting point above 200° C. in its fiber-forming molecular weight range with the proviso that when said hydrocarbon radical is aliphatic said dicarboxylic acid is an aromatic hydrocarbon dicarboxylic acid having carboxyl groups attached to the aromatic ring, said dicarboxylic acid and said organic diol being present in the reaction mixture in a proportion to provide from about 25% to about 65% by weight of ester segments therefrom in said segmented copolymer.

18. The process of claim 17 wherein said dicarboxylic acid is terephthalic acid, said organic diol is a lower aliphatic glycol containing from 2 to 10 carbon atoms, and said polyether glycol is a poly(alkylene oxide)glycol.

References Cited in the file of this patent

UNITED STATES PATENTS

| | | |
|---|---|---|
| 2,744,087 | Snyder | May 1, 1956 |
| 2,744,095 | Caldwell | May 1, 1956 |